Patented Oct. 10, 1933

1,930,229

UNITED STATES PATENT OFFICE 1,930,229

ARTIFICIAL BRISTLES AND PROCESS OF MAKING THE SAME

Camille Dreyfus, New York, N. Y., and William Whitehead and Henry Walter Kuhl, Cumberland, Md., assignors to Celanese Corporation of America, a corporation of Delaware No Drawing. Application November 20, 1928
Serial No. 320,742

5 Claims. (Cl. 18—54)

This invention relates to the spinning of artificial filaments of the heavier type, such as artificial bristles, horse-hair, straw or ribbons and the like, which may be used for making brushes, braids, artificial fur, etc.

An object of our invention is to prepare heavy artificial filaments such as artificial bristles, horse-hair, straw, etc., containing organic derivatives of cellulose that are tougher and stronger than those heretofore made.

Another object of our invention is to prepare heavy artificial filaments containing a resin and particularly a synthetic resin compatible therewith. Other objects of our invention will appear from the following detailed description.

Artificial filaments, when made by the prior processes from solutions containing derivatives of cellulose, are not as stiff and tough as may be desired. We have found that if a resin, and particularly a synthetic resin compatible with the derivative of cellulose employed, is added to the spinning solution, tougher and stiffer bristles may be formed from such solutions.

In accordance with our invention, we prepare heavy filaments by extrusion of solutions containing organic derivatives of cellulose and a suitable resin in an appropriate solvent through orifices of suitable shape or sizes into an evaporative atmosphere, as in dry spinning, or into a precipitating bath, as in wet spinning.

The heavy artificial filaments that may be formed by our invention may be bristles having a denier of 25 to 2000 or more, which may be used for making hair brushes, hand brushes or other brushes, braids or artificial fur. Artificial straw or bands, that are useful for making hats, may also be made by our invention.

The organic derivative of cellulose that may be used in our process may be organic esters of cellulose or cellulose ethers. Examples of organic esters of cellulose are cellulose acetate, cellulose formate, cellulose propionate and cellulose butyrate while examples of cellulose ethers are ethyl cellulose, methyl cellulose and benzyl cellulose.

Any suitable resin may be incorporated in the spinning solution, but we prefer to employ synthetic resins that are compatible with the organic derivative of cellulose employed. Examples of appropriate synthetic resins are fusible and soluble resins prepared by the condensation of phenol and formaldehyde in the presence of an acid catalyst, diphenylol propane-formaldehyde resin, diphenylol propane-acetone resin, toluene sulfonamid-formaldehyde resin, benzene sulfonamid-formaldehyde resin, xylene sulfonamid-formaldehyde resin, phenol-furfural resin, the resin prepared by heating lactic acid under reflux, etc. The addition of natural gums and resins such as manila, accaroids, rosin, dammar, pontianak or shellac, or a semi-synthetic resin such as ester gum, to the spinning solution is not excluded.

While any suitable amount of synthetic resin may be employed, we have found that the use of from 1 to 12% of the same, based on the weight of the cellulose derivative employed in the solution, generally produces satisfactory results. More resin may be employed, say for instance, up to 25 to 50% of the weight of the cellulose derivative, if it is so desired.

Any suitable volatile solvent such as acetone, mixtures of acetone and ethyl or methyl alcohol, mixtures of acetone and water, ethylene dichloride, mixtures of ethylene dichloride and ethyl or methyl alcohol, chloroform, mixtures of chloroform and ethyl or methyl alcohol, or mixtures of methylene chloride and ethyl or methyl alcohol.

If desired, suitable plastifiers or softening agents may be added to the spnning solution. Example of such plastifiers are triacetin, diethyl phthalate, dibutyl phthalate, diethyl tartrate, monomethylene sulfonamid, etc. The use of these plastifiers is particularly desirable when large proportions of resin are employed, in order to overcome the tendency to brittleness that occurs when large amounts of resin, say 30 to 60% of resin based on the weight of the cellulose derivative present, are employed. The amount of plastifier used will vary considerably with the nature of the cellulose derivative employed and the nature and the amount of resin used. Usually however, 5 to 10% of plastifier based on the total weight of the solid present in the spinning solution will be sufficient.

While a spinning solution of any suitable concentration may be employed, we prefer to use spinning solutions containing from 30 to 40% of solid constituents, as described in the copending application 304,806 filed September 8, 1928. In order to prevent breaking of the filaments being formed it is preferable, especially when spinning solutions of lower concentrations are used, to have a roll near the spinning jet so as to support the weight of the filament thus formed as described in copending application 304,807 filed September 8, 1928. Likewise while spinning orifices of any shape, such as circular may be employed, we have found that bristles of more uniform cross section and uniform strength may be formed from spinning jets having orifices that have reentrant angles or cusps, as described in copending application 304,808 filed September 8, 1928.

In order further to illustrate our invention but without being limited thereto, the following specific example is given.

*Example*

A spinning solution containing an acetone soluble cellulose acetate of an acetyl value of 54.5% is made as follows:

|  | Parts by weight |
|---|---|
| Cellulose acetate | 33.7 |
| Toluene sulfonamid-formaldehyde resin | 2.1 |
| Acetone | 54.6 |
| Water | 9.6 |

The spinning solution after thorough mixing and filtering is spun through jets having cruciform orifices corresponding to the shape of a Swiss cross into a drying atmosphere having a temperature of 55° to 87° C., and the bristles formed are drawn off at the rate of about 8 meters per minute.

The bristles so formed are stiffer and stronger than those formed from solutions containing no resins.

It is to be understood that the foregoing detailed description is given merely by way of illustration and that many variations may be made therein without departing from the spirit of our invention.

Having described our invention what we claim and desire to secure by Letters Patent is:

1. Heavy stiff artificial filaments having a denier above 25 containing a derivative of cellulose and a resin, such filaments being formed with reentrant angles or cusps.

2. Heavy stiff artificial filaments having a denier above 25 containing an organic derivative of cellulose and a resin, such filaments being formed with reentrant angles or cusps.

3. Heavy stiff artificial filaments having a denier above 25 containing cellulose acetate and a resin, such filaments being formed with reentrant angles or cusps.

4. Artificial bristles having a denier above 25 containing an organic derivative of cellulose and a synthetic resin compatible therewith, which bristles are strong and tough.

5. Artificial bristles having a denier above 25 containing cellulose acetate and a synthetic resin compatible therewith, which bristles are strong and tough.

CAMILLE DREYFUS.
WILLIAM WHITEHEAD.
HENRY WALTER KUHL.